(12) United States Patent
Bernstein et al.

(10) Patent No.: US 10,345,332 B2
(45) Date of Patent: Jul. 9, 2019

(54) ZERO POWER SENSORS

(71) Applicants: THE CHARLES STARK DRAPER LABORATORY, INC., Cambridge, MA (US); NORTHEASTERN UNIVERSITY, Boston, MA (US)

(72) Inventors: Jonathan J. Bernstein, Medfield, MA (US); Marc S. Weinberg, Needham, MA (US); Amy Duwel, Cambridge, MA (US); Paul A. Ward, Dedham, MA (US); Nicol E. McGruer, Dover, MA (US); Matteo Rinaldi, Boston, MA (US); Eugene H. Cook, Acton, MA (US)

(73) Assignees: THE CHARLES STARK DRAPER LABORATORY, INC., Cambridge, MA (US); NORTHEASTERN UNIVERSITY, Boston, MA (US)

( * ) Notice: Subject to any disclaimer, the term of this patent is extended or adjusted under 35 U.S.C. 154(b) by 456 days.

(21) Appl. No.: 15/288,843

(22) Filed: Oct. 7, 2016

(65) Prior Publication Data
US 2017/0102263 A1     Apr. 13, 2017

Related U.S. Application Data

(60) Provisional application No. 62/238,842, filed on Oct. 8, 2015.

(51) Int. Cl.
| | |
|---|---|
| *G01P 15/135* | (2006.01) |
| *H01H 1/00* | (2006.01) |
| *H01H 35/14* | (2006.01) |

(52) U.S. Cl.
CPC ......... *G01P 15/135* (2013.01); *H01H 1/0036* (2013.01); *H01H 35/144* (2013.01);
(Continued)

(58) Field of Classification Search
CPC .. G01P 15/135; H01H 1/0036; H01H 35/144; H01H 2001/0063; H01H 2001/0078; H01H 2001/0084
(Continued)

(56) References Cited

U.S. PATENT DOCUMENTS

| | | | |
|---|---|---|---|
| 3,524,031 A * | 8/1970 | Mack | H01H 35/14 200/61.53 |
| 5,146,435 A | 9/1992 | Bernstein | |

(Continued)

OTHER PUBLICATIONS

"3D Low Frequency Wakeup Receiver", AMS (2015).
(Continued)

*Primary Examiner* — Lisa M Caputo
*Assistant Examiner* — Rose M Miller
(74) *Attorney, Agent, or Firm* — Lando & Anastasi, LLP

(57) ABSTRACT

An environmental physical sensor is provided that includes a power input terminal, a sensor output terminal, and a resonant switch. The resonant switch includes a mechanical element that is responsive to an environmental stimulus and is coupled to an electrical switch. The electrical switch is operable between an open position and a closed position and electrically connects the power input terminal to the sensor output terminal when in the closed position. The mechanical element is configured to intermittently actuate the electrical switch into the closed position responsive to the environmental stimulus.

21 Claims, 9 Drawing Sheets

(52) U.S. Cl.
CPC ............... *H01H 2001/0063* (2013.01); *H01H 2001/0078* (2013.01); *H01H 2001/0084* (2013.01)

(58) Field of Classification Search
USPC .......................................................... 73/579
See application file for complete search history.

(56) References Cited

U.S. PATENT DOCUMENTS

| | | | |
|---|---|---|---|
| 5,752,410 A | 5/1998 | Bernstein | |
| 5,923,542 A | 7/1999 | Sasaki et al. | |
| 5,991,990 A | 11/1999 | Bernstein | |
| 6,153,962 A | 11/2000 | Noma et al. | |
| 6,373,007 B1 * | 4/2002 | Calcatera | H01H 59/0009 200/181 |
| 6,504,734 B2 | 1/2003 | Navas Sabater et al. | |
| 7,969,754 B2 | 6/2011 | Radecker et al. | |
| 8,193,877 B2 | 6/2012 | Fritz et al. | |
| 8,860,322 B2 | 10/2014 | Wei et al. | |
| 9,093,947 B2 | 7/2015 | Wei et al. | |
| 9,257,917 B1 | 2/2016 | Filardo et al. | |
| 9,419,583 B2 | 8/2016 | Rinaldi et al. | |
| 9,425,765 B2 | 8/2016 | Rinaldi et al. | |
| 2005/0281061 A1 | 12/2005 | Radecker et al. | |
| 2009/0039798 A1 | 2/2009 | Siessegger | |
| 2011/0128112 A1 * | 6/2011 | Aimi | H01H 1/0036 337/298 |
| 2012/0202435 A1 * | 8/2012 | Kim | H04B 5/0037 455/69 |
| 2015/0123493 A1 * | 5/2015 | Shau | H02M 1/24 307/115 |
| 2017/0102263 A1 | 4/2017 | Bernstein et al. | |

OTHER PUBLICATIONS

Adams et al. "A Review of Adhesion in an Ohmic Microswitch", Journal of Adhesion Science and Technology (2010) vol. 24, pp. 2571-2595.

Brocato Sandia Report (2004) SAND 2004-4610.

Chen et al. "Contact resistance study of noble metals and alloy films using a scanning probe microscope test station", J. Appl. Phys. (2007) vol. 102, No. 074910.

Du et al. "A finite element model of loading and unloading of an asperity contact with adhesion and plasticity", Journal of Colloid and Interface Science (2007) vol. 312, No. 2, pp. 522-528.

Gu et al. "Radio-Triggered Wake-Up Capability for Sensor Networks", Proceedings of the 10th IEEE Real-Time and Embedded Technology and Applications Symposium (2004).

Lin et al. "A Resonance Dynamical Ap-proach to Faster, More Reliable Micromechanical Switches", IEEE Frequency Control Symposium (2008) pp. 640-645.

Lin et al. "The Micromechanical Resonant Switch ('Resoswitch')", Digest Solid State Sensor, Actuator, and Microsystems Workshop (2004) pp. 40-43.

Majumder et al. "Study of Contacts in an Electrostatically Actuated Microswitch", Sensors and Actuators (2001) vol. 33, pp. 19-26.

Makaram et al. "Scalable Nanotemplate Assisted Directed Assembly of Single Walled Carbon Nanotubes for Nanoscale Devices", Applied Physics Letters (2007) vol. 90, No. 243108.

Olsson "Zero Power Acoustic Signal Processing", Science Matters Sandia National Laboratories (2015).

Parks et al. "A Wireless Sensing Platform Utilizing Ambient RF Energy" Biomedical Wireless Technologies, Networks, and Sensing Systems (2013) pp. 154-156.

Parks et al. "Sifting Through the Airwaves: Efficient and Scalable Multiband RF Harvesting" IEEE International Conference on RFID (IEEE RFID) (2014) pp. 74-81.

Rinaldi et al. "Reconfigurable CMOS Oscillator based on Multi-Frequency AlN Contour-Mode MEMS Resonators", IEEE Transactions on Electron Devices (2011) vol. 58, No. 5, pp. 1281-1286.

Rinaldi et al. "Super High Frequency Two-Port AlN Con-tour-Mode Resonators for RF Applications", IEEE Transactions on Ultrasonics, Ferroe-lectrics, and Frequency Control (2010) vol. 57, No. 1, pp. 38-45.

Ryan et al. "Single walled carbon nanotube electromechanical switching behavior with shoulder slip", J. Micromech. Microeng. (2011) vol. 21, No. 045028.

Sifuentes et al. "Wireless Magnetic Sensor Node for Vehicle Detection", IEEE Sensors Journal (2011) vol. 11, No. 8, pp. 1669-1676.

Tomimatsu et al. "A wake-up switch using a piezoelectric differential pressure sensor", IEEE Intelligent Sensors, Sensor Networks and Information Processing Conference (2013) pp. 23-26.

Tomimatsu et al. "A piezoelectric flow sensor for use as a wake-up switch for a wireless sensor network node", IEEE 2012 Second Workshop on Design, Control and Software Implementation for Distributed MEMS (2012) pp. 53-37.

Wong et al. "Micromechanical Mixer-Filters ('Mixlers')", JMEMS (2004) vol. 13, No. 1, pp. 100-111.

Zaghloul et al. "Sub-1-volt Piezoelectric Nanoelectromechanical Re-lays With Millivolt Switching Capability", IEEE Electron Device Letters (2014) vol. 35.6, pp. 669-671.

* cited by examiner

ZERO POWER SENSORS

CROSS-REFERENCE TO RELATED APPLICATIONS

This application claims the benefit under 35 U.S.C. § 119(e) of co-pending U.S. Provisional Patent Application No. 62/238,842 titled ZERO POWER SENSORS (ZePS) and filed on Oct. 8, 2015, which is herein incorporated by reference in its entirety for all purposes.

FEDERALLY SPONSORED RESEARCH

This invention was made with government support under Contract No. HR 0011-15-C-0138 awarded by DARPA/MTO. The government has certain rights in the invention.

BACKGROUND

Environmental sensors and detectors that sense physical characteristics, events, phenomena, or objects are used in many industrial, chemical, security, and military environments to detect events or the presence of objects. Some sensors are battery powered, allowing them to be remote and/or wireless, and allowing flexibility in varying applications. Additionally, some sensors are used to detect uncommon or irregular events, remaining in a standby mode for significant amounts of time before an event occurs to trigger the sensor. Power consumption in the standby mode is of significant interest because battery powered sensors may exhaust the energy in the battery while in standby mode, and therefore a sensor with relatively higher power consumption requires more frequent battery replacement or recharging, increasing costs, effort, and complexity to maintain.

SUMMARY OF INVENTION

The present disclosure relates to sensors, and more particularly to sensors that require little or no power in standby mode yet can detect an environmental physical stimulus and provide a signal upon detecting the stimulus. The sensors disclosed herein include electromechanical switches that respond to physical stimuli in the environment and provide an event detection output signal. The output signal may trigger equipment that otherwise may remain in an off condition, using little or no power until the event detection.

According to one aspect, an environmental physical sensor is provided. The sensor includes a power input terminal, a sensor output terminal, and a resonant switch including a mechanical element responsive to an environmental stimulus, and an electrical switch coupled to the mechanical element and operable between an open position and a closed position. The electrical switch is configured to electrically connect the power input terminal to the sensor output terminal when in the closed position, and the mechanical element is configured to intermittently actuate the electrical switch into the closed position responsive to the environmental stimulus.

In an embodiment, the sensor includes an integrator circuit electrically connected between the electrical switch and the sensor output terminal, the integrator circuit is configured to receive and integrate energy pulses from the power input terminal to provide a detection signal at the sensor output terminal. The integrator circuit may include an electrical energy storage element that is one of a capacitor and an inductor.

In embodiments, the environmental stimulus may be an acoustic signal, a vibration, a varying magnetic field, thermal energy, radiation, or an electric field.

In various embodiments, the electrical switch may include a material with a contact adhesion force of up to 100 micro-Newtons. The electrical switch may include a mechanically flexible mount configured to be flexibly compliant in response to being actuated into a closed position. The electrical switch may include a contact gap of up to 10 microns.

In embodiments, the mechanical element is configured to vibrate at a resonant frequency. The mechanical element may vibrate rotationally, and may be a rotor. The mechanical element may include at least one electrostatic tuning element configured to apply an electrostatic force that alters the resonant frequency of the mechanical element.

In embodiments, the mechanical element may include a paddle mounted to pivot about a pivot axis to actuate the electrical switch into the closed position. The paddle may include a solid portion on a first side of the pivot axis and a perforated portion on a second, opposing side of the pivot axis. The sensor may include an acoustic cavity coupled to the paddle. In certain embodiments, the pendulosity of the paddle on one side of the pivot axis may be substantially equal and opposite to the pendulosity of the paddle on the opposing side of the pivot axis, resulting in substantially zero pendulosity of the paddle.

In embodiments, the mechanical element may include an imbalance creating a non-zero pendulosity, and the pendulosity may be configured to influence responsiveness of the mechanical element to the environmental stimulus.

In embodiments, the electrical switch is configured to have a substantially zero current leakage when in the open position.

According to another aspect, an environmental physical sensor is provided that includes a power input terminal, a sensor output terminal, a first resonant switch including a first mechanical element responsive to a first component of an environmental stimulus and a first electrical switch coupled to the power input terminal and coupled to the first mechanical element and operable between an open position and a closed position, the first mechanical element being configured to intermittently actuate the first electrical switch into the closed position responsive to the first component of the environmental stimulus, and a second resonant switch including a second mechanical element responsive to a second component of the environmental stimulus and a second electrical switch coupled to the first electrical switch and coupled to the sensor output terminal and coupled to the second mechanical element and operable between an open position and a closed position, the second mechanical element being configured to intermittently actuate the second electrical switch into the closed position responsive to the second component of the environmental stimulus.

According to an embodiment, the first electrical switch and the second electrical switch are configured to electrically connect the power input terminal to the sensor output terminal in response to a particular logical combination of presence or absence of the first component of the environmental stimulus and presence or absence of the second component of the environmental stimulus.

In embodiments, the first component and the second component are each one of an acoustic signal, a vibration, a varying magnetic field, thermal energy, radiation, and an electric field.

In embodiments, the first component has a first frequency and the second component has a second frequency different from the first frequency.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Embodiments of sensors disclosed herein include electro-mechanical resonant switches that respond to physical stimuli in the environment, such as magnetic, acoustic, and vibratory disturbances, to make intermittent electrical connections between a power source and a signal output. The signal output provides an event detection signal that may be integrated or pulse-smoothed in accord with particular application requirements, such as to generate a 1 volt, 1 msec trigger signal, for example. The trigger signal may be used to turn on other equipment, sensors, recorders, and the like. The other equipment may remain in an off condition, using little or no power, until the sensor provides the event detection signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
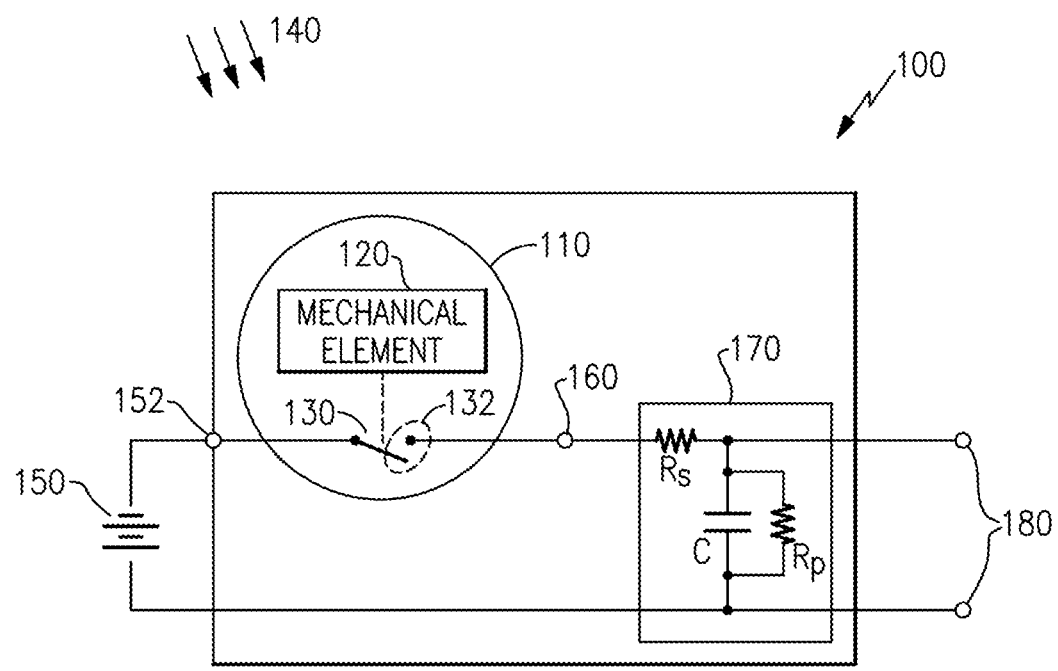
FIG. 1 is a schematic diagram of an example of a physical sensor.

Referring to FIG. 1, there is illustrated a block diagram of one example of a sensor 100 in accord with aspects and embodiments disclosed herein. The sensor 100 includes a resonant switch 110 having a mechanical element 120 coupled to an electrical switch 130 having at least one contact 132. The mechanical element 120 is responsive to an environmental physical stimulus 140, such as a vibration, an acoustic wave, a magnetic or electric field, temperature, or radiation, for example, that causes the mechanical element 120 to resonate and, by its resultant coupling to the electrical switch 130, intermittently closes the contact 132 of the electrical switch 130. When the contact 132 is closed, a voltage source, such as a battery 150, can provide power from the power terminal 152 to an output terminal 160. The electrical switch 130 allows intermittent pulses of electrical energy to be provided from the battery 150 to the output terminal 160 when the resonant switch 110 is activated by the stimulus 140. The sensor 100 may optionally include an integrator circuit 170 connected to the output terminal 160 that progressively captures, or integrates, the intermittent pulses of electrical energy and provides an integrated output signal at a sensor output terminal 180.

As described above, the resonant switch 110 includes the mechanical element 120 coupled to the electrical switch 130. As described further below, the mechanical element 120 may include any of a variety of mechanical arrangements configured to respond to the environmental stimulus 140. The electrical switch 130 may be integrally formed with the mechanical element 120, such that the resonant switch 110 is a micro electro mechanical system (MEMS) device that provides electrical connectivity at the contact 132 in response to the presence of a particular stimulus 140.

In the embodiment of FIG. 1, no electrical energy from the battery 150 is consumed when the battery is connected to the sensor 100, unless and until a stimulus 140 is present to which the mechanical element 120 is responsive.

The stimulus 140 may include, for example, radiating signals from devices of interest. For example, a moving automobile nearby may emit acoustic noise through the air, vibrational energy through the ground, and a varying magnetic field from firing of the spark plugs and/or operation of the alternator. Other examples of objects or events that may emit acoustic, vibrational, and/or magnetic energy include generators, industrial equipment, missiles, aircraft, trains, and other vehicles; weather events such as wind, storms, hail, thunder, and lightning; explosive equipment and explosions; sirens or alarms; animals or people in motion, etc. A sensor such as the sensor 100 may be advantageously used to monitor for the presence of such objects or events without consuming power from the battery 150 until the stimulus 140 is present.

In certain embodiments, the integrator circuit 170 may be connected to additional circuitry to provide the integrated output signal at the sensor output terminal 180 to the additional circuitry. For example, the integrator circuit 170 may provide its captured energy to power other circuitry, or the captured energy may drive a brief output signal that triggers a latched relay that powers further circuitry from the battery 150 or another energy source. The additional circuitry may, for example, include further sensor circuitry, recording circuitry, or signal circuitry that communicates the presence of the target object, event, or signal, which may further trigger an alarm or other response.

In the sensor 100 of FIG. 1, the integrator circuit 170 is a passive RC circuit including a series resistor $R_s$, a capacitor C, and a parallel resistor $R_p$ as shown. When the stimulus 140 is present, the mechanical element 120 responds mechanically and intermittently closes the electrical switch 130 to electrically connect to the contact 132, which intermittently completes a circuit from the battery 150 to the integrator circuit 170. The capacitor C charges a certain amount each time the electrical switch 130 is closed and the charge on the capacitor C is indicative of the number of times the electrical switch 130 has closed. With each closure of the electrical switch 130, the capacitor C gains an additional charge. The series resistor $R_s$ limits the current from the battery to the capacitor C and prevents a spike of current from occurring each time the contact 132 is connected (i.e., each time the electrical switch 130 closes). The parallel resistor $R_p$ is connected in parallel with the capacitor C and slowly discharges the capacitor whenever the electrical switch 130 is open, such as when the stimulus 140 is no longer present, resetting the integrator circuit 170 for a later event triggered by the stimulus 140. In other embodiments, the integrator circuit 170 may include alternate resistor-capacitor arrangements, including more elements, or may include one or more inductors instead of, or in addition to, one or more capacitors, or may include active elements or take other forms, or may be absent.

Figure 2A:
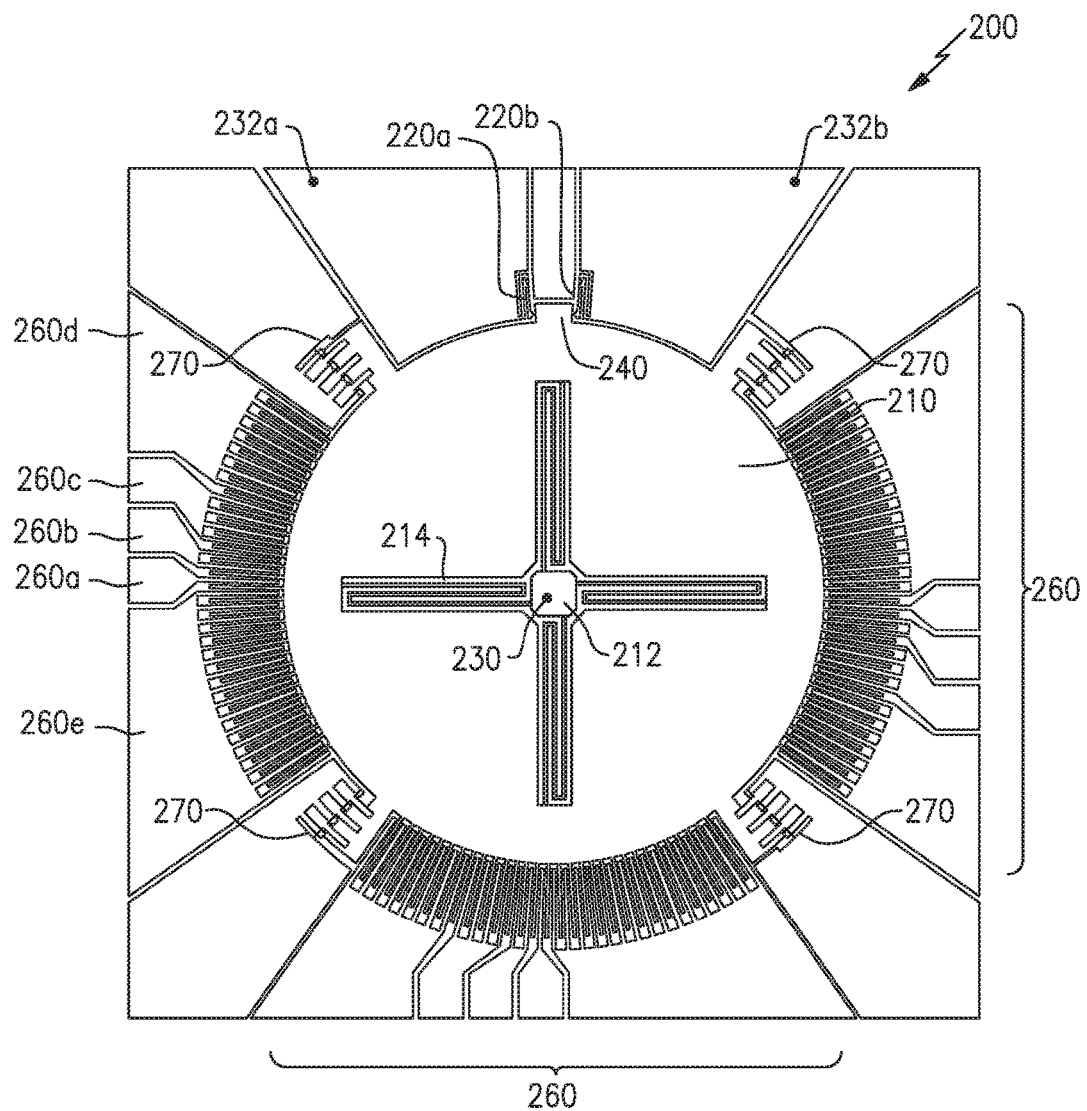
FIGS. 2A-2B are schematic diagrams of an example of a vibration switch.

One example of a resonant switch 110 includes a vibration switch that may be formed from a rotational or translational accelerometer. For example, FIG. 2A shows a vibration switch 200 that is a rotational accelerometer that may be fabricated as a MEMS device and may be used as the resonant switch 110. The vibration switch 200 detects vibrations at a particular frequency to detect a signature or target signal, e.g., the stimulus 140, generated by an object or event in the environment. In the illustrated example, the vibration switch 200 includes a rotor disk 210 suspended from a central anchor 212 by flexible arms 214. A set of contacts 220 are positioned such that sufficient motion of the rotor disk 210 intermittently closes one or more of the contacts 220. As discussed above, in other embodiments a vibration switch may include a translational or linear accelerometer or may take other forms.

The vibration switch 200 has a particular resonant frequency that depends upon the stiffness of the flexible arms 214, e.g., a spring constant, and the distribution of mass of the rotor disk 210, among other things. Depending upon particular applications and operational requirements, a vibration switch, such as vibration switch 200, or any resonant switch described herein, may be designed to resonate at substantially low frequencies, such as single-digit or tens of cycles per second (Hertz), or up to kilohertz or even megahertz range in certain embodiments. In addition to resonant frequency, characteristics of any of the resonant switches described herein, including the vibration switch 200, include sensitivity and selectivity. Sensitivity is a measure of the strength of the mechanical response, e.g., the amount or amplitude of motion excited by the stimulus 140. The sensitivity may also be called a gain as it relates an amplitude or intensity of a response to the amplitude or intensity of the stimulus. A resonant switch having a mechanical element that moves more in response to a given stimulus has a higher gain, or sensitivity, than a resonant switch having a mechanical element that moves less. Selectivity is a measure of how well a resonant switch reacts to only the resonant frequency and not to other nearby frequencies. A common parameter for this is the quality factor, or Q-factor, of a resonant system. Altering the size, materials, and other aspects of the elements of the resonant switches described herein, including vibration switch 200, allows design and fabrication of resonant switches with varying resonant frequency, sensitivity, and selectivity to accommodate differing operational parameters and applications.

Returning to FIG. 2A, the vibration switch 200 also includes terminals 230, 232a, and 232b. The terminal 230 is electrically connected to the central anchor 212 and provides electrical connectivity through the flexible arms 214 and the rotor disk 210 to one side each of contact 220a and 220b. The other side of contact 220a is electrically connected to the terminal 232a and the other side of contact 220b is electrically connected to the terminal 232b. A vibrational environmental stimulus causes the rotor disk 210 to vibrate. If the environmental stimulus is strong enough and has a frequency sufficiently close to the resonant frequency, vibration of the rotor disk 210 intermittently closes one or both of the contacts 220. Closure of either of the contacts 220 causes an electrical connection to exist between the terminal 230 and a respective one of the terminals 232. Accordingly, the terminal 230, the contact 220a, and the terminal 232a form a switch that may form the electrical switch 130 of FIG. 1. Likewise, the terminal 230, the contact 220b, and the terminal 232b form a switch that may form the electrical switch 130 of FIG. 1. Additionally, the terminals 232a and 232b may be electrically tied together so that in combination with the terminal 230 and both contacts 220a, 220b, they form a switch, such as electrical switch 130 of FIG. 1, that provides an electrical connection each time contact is made at either of contacts 220a or 220b.

In the vibration switch 200 of FIG. 2A, a protrusion 240 from the rotor disk 210 provides one side of the contact 220a and also one side of the contact 220b. The protrusion 240 contributes to an overall imbalance of the rotor disk 210 that increases the sensitivity of the vibration switch 200, e.g., a larger imbalance causes the rotor disk 210 to vibrate at higher amplitude when excited at or near the resonant frequency. Accordingly, the protrusion 240 allows tailoring of the design of the vibration switch 200 to adjust the level of excitation energy required in the stimulus 140 to trigger sufficient vibration of the rotor disk 210 to cause an electrical connection to be made at either of the contacts 220. Pendulosity is the vector summation of the distributed mass in the system by a position vector from the anchor point, and is a measure of imbalance. For example, if the mass of the rotor disk 210 is distributed to be perfectly balanced, for example without a protrusion 240, the rotor disk 210 would have zero pendulosity. In certain embodiments, the vibration switch 200 may be required to have a resonant frequency in the range of 10 to 120 Hertz, with a Q-factor such that the protrusion 240 will move enough cause closure of the contacts 220 at the resonant frequency but not to move enough to cause closure of the contacts 220 due to the effects of gravity or due to a linear acceleration. Accordingly, the pendulosity of the vibration switch 200 may be designed to influence the responsiveness of the rotor disk 210 to achieve the required Q-factor.

In addition to the amplitude of vibration of the rotor disk 210, and therefore the protrusion 240, another factor in whether an electrical connection is made by the vibration is a gap size at each of the contacts 220a, 220b. In certain embodiments the gap is a nominal 5 microns (micrometers, μm) but may be 10 microns or more, or may be sub-micron distances depending upon the frequency and strength of the stimulus 140 to be detected and on the geometry, size, and materials of the resonant switch 100. Further, overall material selections and geometry, including sizes, position, and thicknesses, affect the resonant frequency, sensitivity, and selectivity and allow varying designs to accommodate changing operational requirements and applications. For example, if the vibration switch 200 is to be applied to a sensor for detecting a truck driving over soft earth at 20 meters distance, for example, a vibration switch 200 may be designed and fabricated for a particular frequency and strength of the particular stimulus 140 targeted for detection, i.e., the vibration emanating from the truck and propagating through the ground. Other vibration switches may be designed differently.

Figure 2B:
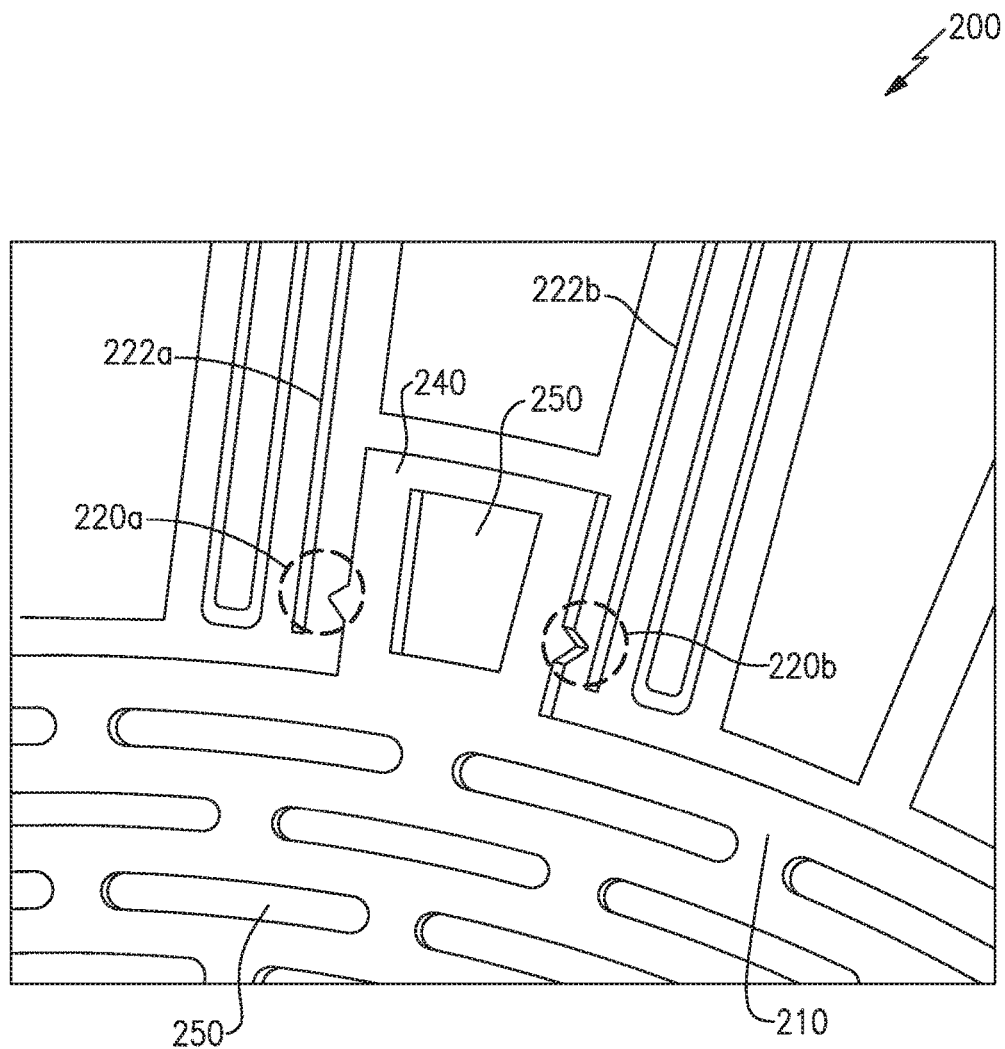

Referring to FIG. 2B, there is shown a more detailed or enlarged view of the vibration switch 200 in the region of the contacts 220 and showing a gap between the protrusion 240, which forms one side of each contact 220, and two flexible springs 222 that each include the other side of each contact 220. Each of the flexible springs 222a, 222b is in respective electrical contact with each of the terminals 232a, 232b. When the vibration switch 200 is resonating and causes the protrusion 240 to intermittently touch, i.e., contact, each of the respective flexible springs 222, the point of contact affects the resonant vibration, e.g., by changing the stiffness of the system. The flexible springs 222 are flexibly compliant so contact with them does not cause the protrusion 240 (and the rotor disk 210) to come to a sudden stop. The flexible springs 222 allow a less instantaneous change to the motion of the protrusion 240 and therefore a lesser reduction of the vibration of the rotor disk 210.

Additionally shown in FIG. 2B are slots or holes 250 in the rotor disk 210 and the protrusion 240. The holes 250 adjust the overall mass and mass distribution of the rotor disk 210 and the protrusion 240. The design (e.g., shape, size, number, distribution, etc.) of the holes 250 may be altered to adjust the resonant frequency, sensitivity, or selectivity of the vibration switch 200. Accordingly, other embodiments may include more or fewer holes of varying shape, size, and distribution, or may include no holes at all.

The contacts 220 are made to be low adhesion. That is, the geometry and materials used at the point of contact, i.e., the materials used on the surfaces of the protrusion 240 and the flexible springs 222 at the contacts 220, may be selectively chosen to minimize "stiction," or "sticking" between the two sides of the contact. For example, adhesion can be measured as the amount of force required to separate two objects in contact with each other, and the materials and geometry of the contact area influence the amount of contact adhesion force. The contacts disclosed herein, such as contacts 220, may be designed to have adhesion forces up to hundreds of micro-Newtons or may be designed to have adhesion forces in the single or tens of micro-Newton range, or lower to tens of nano-Newtons. Additionally, repeated closure of a contact, such as the contacts 220, may change the local geometry of the materials, due to plastic deformation, and change the adhesion over time. In certain embodiments, the material at the point of contact is a conducting Ruthenium or Ruthenium oxide. Alternate embodiments may include Tungsten or other materials.

Certain design parameters of a vibration switch 200 may be selected to result in a particular resonant frequency, and fabrication may be carefully controlled to produce a vibration switch 200 in accord with the design parameters. However, varying tolerances and process variation may affect stiffness and other parameters that influence a resulting resonant frequency of a particular fabricated vibration switch 200. Accordingly, with reference to FIG. 2A, certain embodiments may involve additional handling during fabrication or additional features to allow tuning of the resonant frequency, and other parameters, after fabrication of the vibration switch 200. Some additional handling allows a permanent adjustment to the resonant frequency, while other handling and features allow temporary or reversible adjustments to the resonant frequency.

For example, mass may be added to or removed from any component of the vibration switch 200 by depositing metal or other materials or by etching away or ablating material from particular locations. Additionally, a spring constant may be adjusted by altering the stiffness of the components, for example by adding or removing material from the flexible arms 214, for which small changes in the shape may cause dramatic changes in stiffness and therefore resonant frequency.

An additional manner of adjusting stiffness and resonant frequency includes using electrostatic forces. For example, the vibration switch 200 of FIG. 2A includes three sets of tuning elements 260. Each tuning element 260 includes one or more teeth made of electrically conducting material in close proximity to, but with a gap from, similar structures attached to, or protruding from, the rotor disk 210, that in the embodiment of FIG. 2A forms interposed comb structures. Electrically conducting teeth in proximity to one another form capacitive elements that, when a voltage is applied, exert a force on the rotor disk 210. For the geometry shown in FIG. 2A, the force is substantially aligned with the circumferential direction of motion of the rotor disk 210.

Because the tuning elements 260 are stationary, voltage applied to one or more of the tuning elements 260 aids rotation of the rotor disk 210 by exerting electrostatic force on the rotor disk 210 in the circumferential direction, effectively decreasing the stiffness of the system. Accordingly the resonant frequency of the rotor disk 210, and the vibration switch 200 as a whole, may be adjusted. The higher the voltage applied and/or the more tuning elements 260 to which a voltage is applied, the lower the resonant frequency. The overall effect is equivalent to an additional negative spring constant in that the system as a whole may be analyzed, and therefore designed, by combining the spring constant of the flexible arms 214 with the spring constant of any applied electrostatic forces.

The tuning elements 260 shown in the vibration switch 200 of FIG. 2A are arranged to allow multiple variations in affecting the resonant frequency. For example, tuning element 260a includes one tooth to form a capacitor with a corresponding tooth attached to the rotor disk 210, while tuning element 260b has two teeth, tuning element 260c has four teeth, tuning element 260d has eight teeth, and tuning element 260e has sixteen teeth. The arrangement of tuning elements 260 shown allows a great degree of flexibility in tuning the resonant frequency of the vibration switch 200. For example, given a single charging voltage, any binary multiple of electrostatic force may be applied, i.e., the force exerted by tuning element 260c is double that of tuning element 260b, for a given voltage, and tuning element 260d is double that of tuning element 260c, for example. Alternately, any of the tuning elements 260 may be charged to any particular voltage as necessary to affect the stiffness and therefore the resonant frequency. Additionally, the vibration switch 200 shown includes three sets of tuning elements 260, not all of which need be utilized, allowing even greater flexibility. Thus, for a given tuning voltage, any value of adjustment to the spring constant may be applied in increments of the smallest adjustment, i.e., that applied by a single tuning element 260a. Other embodiments may include tuning elements of a different nature, e.g., not capacitive, and may include tuning elements of differing geometry or arrangement and may include more or fewer tuning elements or none at all.

Also shown in FIG. 2A are combs 270 that are drive/sense combs. The combs 270 are oriented generally orthogonal to the tuning elements 260 such that the combs 270 substantially do not affect the stiffness of the system or the resonant frequency. The combs 270 may enable electrical testing of the resonator by providing constant electrostatic forces that do not change with rotation angle. The combs 270 may also enable electrostatic detection of position.

Certain embodiments of a vibration switch, such as the vibration switch 200, may be packaged with varying materials for protection and ease of transportation and inclusion in various applications, such as the sensor 100 of FIG. 1, and may be provided with leads to provide terminals on the exterior of the package. The vibration switch may be packaged in an evacuated, or near vacuum, environment to increase a quality factor or reduce or eliminate any impact of acoustic, pressure, or sound waves on the functioning of any vibrational element, such as a rotor, rotor disk 210, or a translational element, that might otherwise create false triggering, i.e., closure of the electrical contacts 220, and to limit the vibration switch's response to mechanical vibrations.

Another example of a resonant switch 110 (from FIG. 1) includes an acoustic switch that may be formed from, for example, a central diaphragm that flexes or moves axially, or a structure that pivots about a mounting point, or any other structure that can respond to pressure variations in a medium, such as acoustic or sound waves in air. As with the vibration switch embodiment previously described, an acoustic switch may be fabricated as a MEMS device and may be used as the resonant switch 110. An acoustic switch detects acoustic vibrations at a particular frequency to detect a signature or target signal, e.g., the stimulus 140, generated by an object or event in the environment.

Figure 3A:
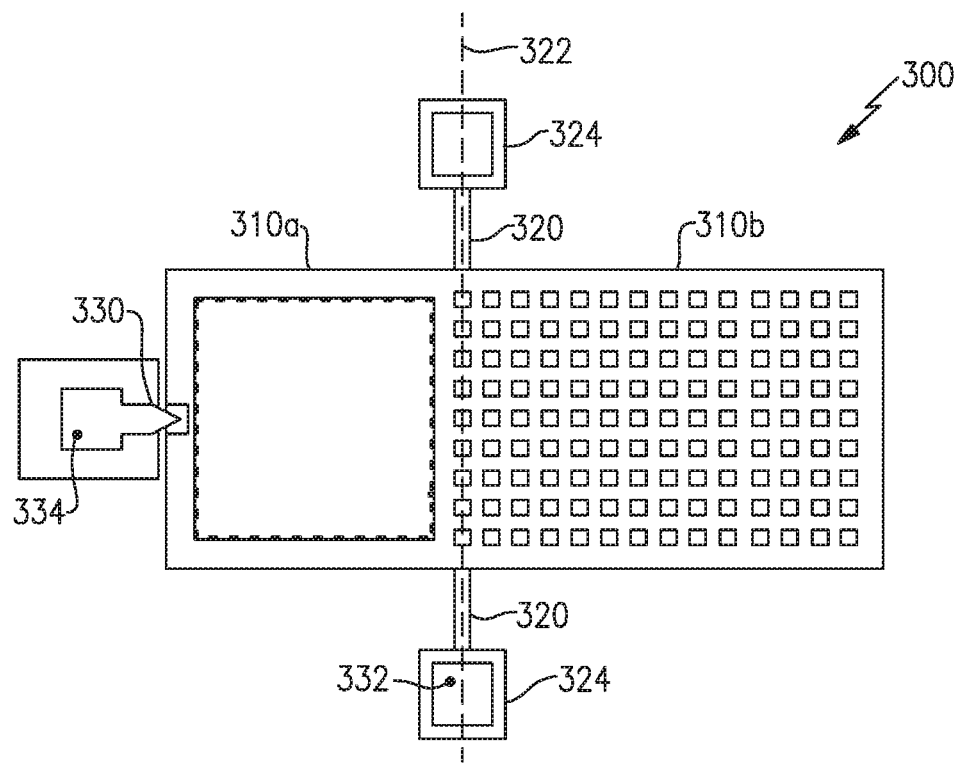
FIGS. 3A-3C are schematic diagrams of an example of an acoustic switch.
Figure 3B:
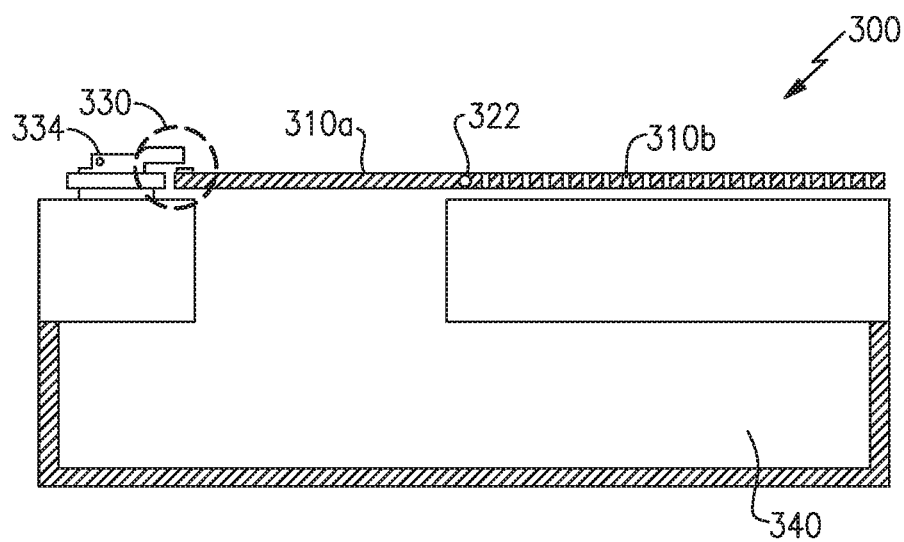

FIGS. 3A and 3B show a top view and a side view, respectively, of an example embodiment of an acoustic switch 300. The acoustic switch 300 includes a pivoting paddle 310 having a solid portion 310a and a perforated portion 310b, supported by pivot arms 320 that allow the paddle 310 to pivot about an axis 322. The pivot arms 320 are supported by pivot pads 324. The perforated portion 310b is perforated to allow air, or any other medium surrounding the paddle 310, to move between the top and bottom surfaces of the perforated portion 310b and thereby minimize any forces upon the perforated portion 310b caused by acoustic energy, e.g., in the form of pressure waves or variations, arriving at the perforated portion 310b. Acoustic energy arriving at the solid portion 310a, however, affects only the top surface of the solid portion 310a and thereby causes unequal forces between the top and bottom of the solid portion 310a that tend to pivot the paddle 310 about the axis 322.

The paddle 310 may be substantially balanced such that the solid portion 310a is formed with nearly or identically the same moment of inertia as the perforated portion 310b. Additionally, the paddle 310 may have substantially equal but opposite pendulosity comparing the solid portion 310a with the perforated portion 310b, resulting in substantially zero pendulosity of the paddle 310 overall. This may reduce or eliminate erroneous responses to, e.g., linear acceleration. A balanced paddle 310 may achieve substantial immunity to non-acoustic acceleration.

The acoustic switch 300 further includes a contact 330 that closes, i.e., makes electrical contact, when the paddle portion 310a pivots far enough, e.g., up out of the plane of FIG. 3A, or clockwise as shown in FIG. 3B. When the contact 330 closes, it completes an electrical circuit between two terminals 332 and 334, with electrical connectivity from the terminal 332 through one of the pivot arms 320, through the paddle 310, and through the contact 330 to the terminal 334. In alternate embodiments, the electrical connectivity may follow a different route and/or one or more additional contacts may be included, such as below the solid portion 310 as well as above, as shown, or the contacts may take different forms. As discussed above regarding the vibration switch 200, the materials used on the surfaces of the contact 330 may be low adhesion and the contact 330 may be flexibly mounted to reduce impact on the paddle 310 during closure of the contact 330.

The resonant frequency of the acoustic switch 300 is affected by the geometry, e.g., size, shape, and materials, of the paddle 310 and by an acoustic cavity 340, as shown in FIG. 3B, coupled to the solid portion 310a of the paddle 310. The acoustic cavity 340 is sized to have a particular acoustic compliance at an expected temperature and pressure for a given medium, such as air, resulting in a desired resonant frequency for the paddle 310. Alternate mediums include gases other than air and fluids such as oil, water, and the like. In certain embodiments, the acoustic cavity may be adjustable, as shown in FIG. 3C, to allow adjustment of the resonant frequency of the acoustic switch 300 after fabrication.

Figure 3C:
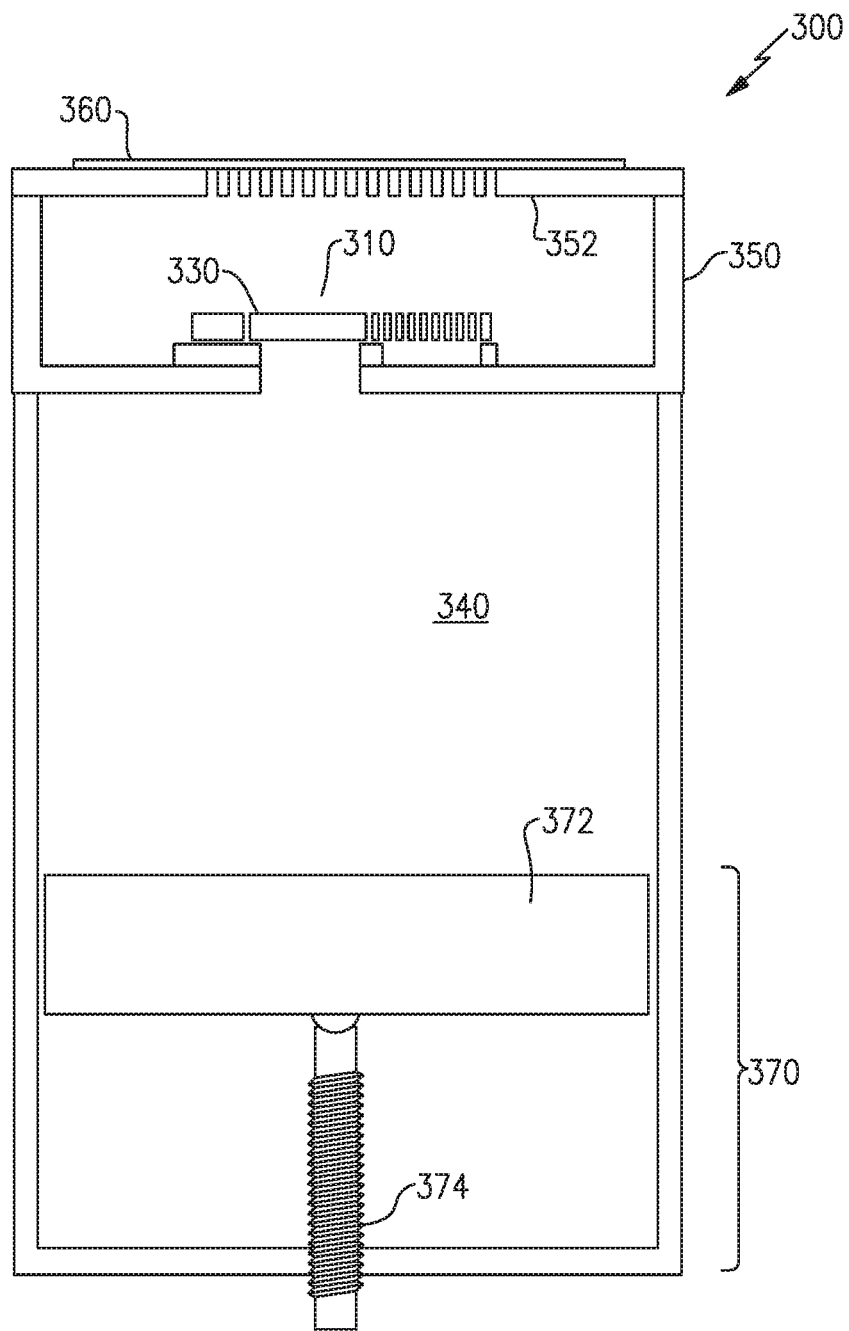

FIG. 3C further shows features of an example of a packaged form of the acoustic switch 300 that includes a protective chamber 350, in which the paddle 310 resides, that includes a perforated lid 352 to allow acoustic energy, e.g., pressure variations, into the chamber 350. The packaged acoustic switch 300 also includes a dust filter 360 protecting the perforated lid 352 to prevent or reduce foreign objects from entering the chamber 350.

Also shown in FIG. 3C is the acoustic cavity 340 having an adjustable means 370, provided by a plunger or piston 372 movably held in place by a threaded 374 engagement with a wall of the acoustic cavity 340. Alternate embodiments may include other forms of adjustability of the acoustic cavity.

Figure 4A:
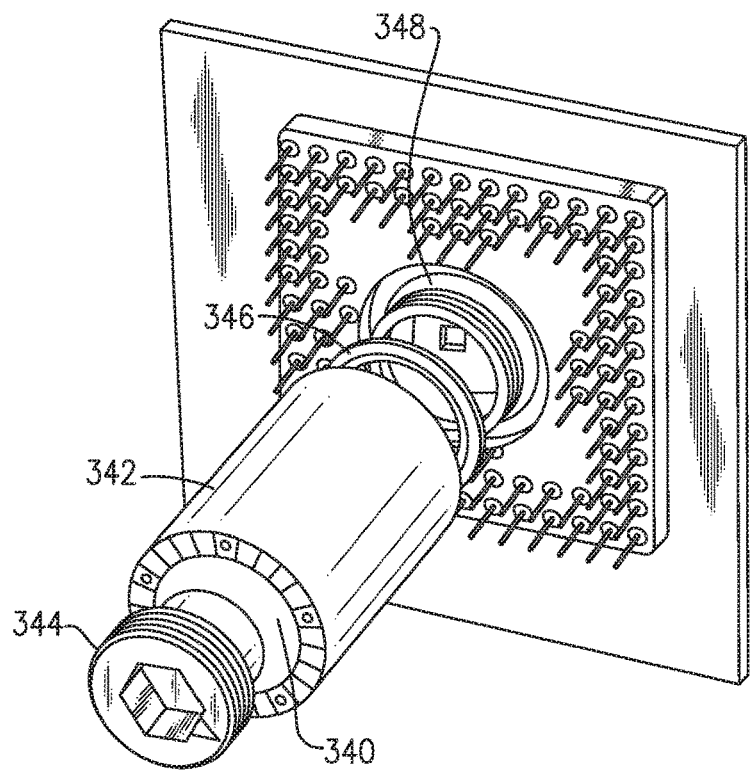
FIGS. 4A-4B are schematic diagrams of an example of packaging for the acoustic switch shown in FIGS. 3A-3C.
Figure 4B:
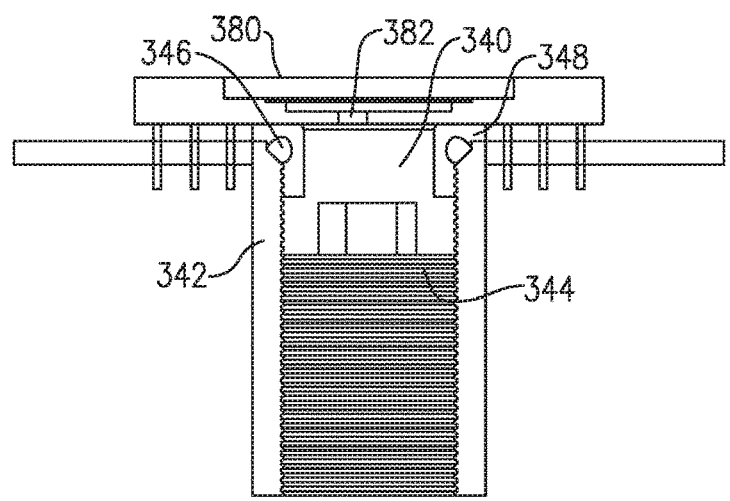

FIGS. 4A and 4B are views of an example of a package for an acoustic switch, such as the acoustic switch 300. FIGS. 4A and 4B illustrate an assembly of an adjustable acoustic cavity with an adjustable means. The acoustic cavity 340 is bounded by a sidewall 342 and plug 344 in adjustable threaded engagement with the sidewall 342 from one end. The other end of the sidewall 342 is in threaded engagement with a flange 348, having an o-ring acoustic seal 346 compressed therebetween. The flange 348 is connected to, or integrally formed with, a carrier 380, upon which the pivot pads 324, the contact 330, and the paddle 310 are mounted, and the carrier 380 includes an acoustic window 382 to provide acoustic coupling between the acoustic cavity 340 and the solid portion 310a of the paddle 310.

As with the vibration switch previously described, certain modifications can be made to an acoustic switch, such as the acoustic switch 300. For example, tuning elements, such as capacitive tuning elements or other tuning elements, may be included to provide further tunability of the resonant frequency of the mechanical element coupled to the switch contacts, such as the paddle 310. Additionally, material may be added or removed from any of the components of an acoustic switch to permanently alter the resonant frequency or a range of frequencies in which the resonant frequency may be tuned by the tuning elements, e.g., an adjustable cavity and/or capacitive tuning elements. Additionally, the contact may be formed with a varying gap size and may provide a varying amount of stiffness, or give, to allow some movement upon contact closure, reducing the impact of the contact on the motion of the mechanical element, such as the paddle 310. As with the vibration switch 300, in certain embodiments of an acoustic switch the gap is a nominal 5 microns (micrometers, μm) but may be 10 microns or more, or may be sub-micron distances depending upon the frequency and strength of the stimulus 140 to be detected and on the geometry, size, and materials.

Figure 5:
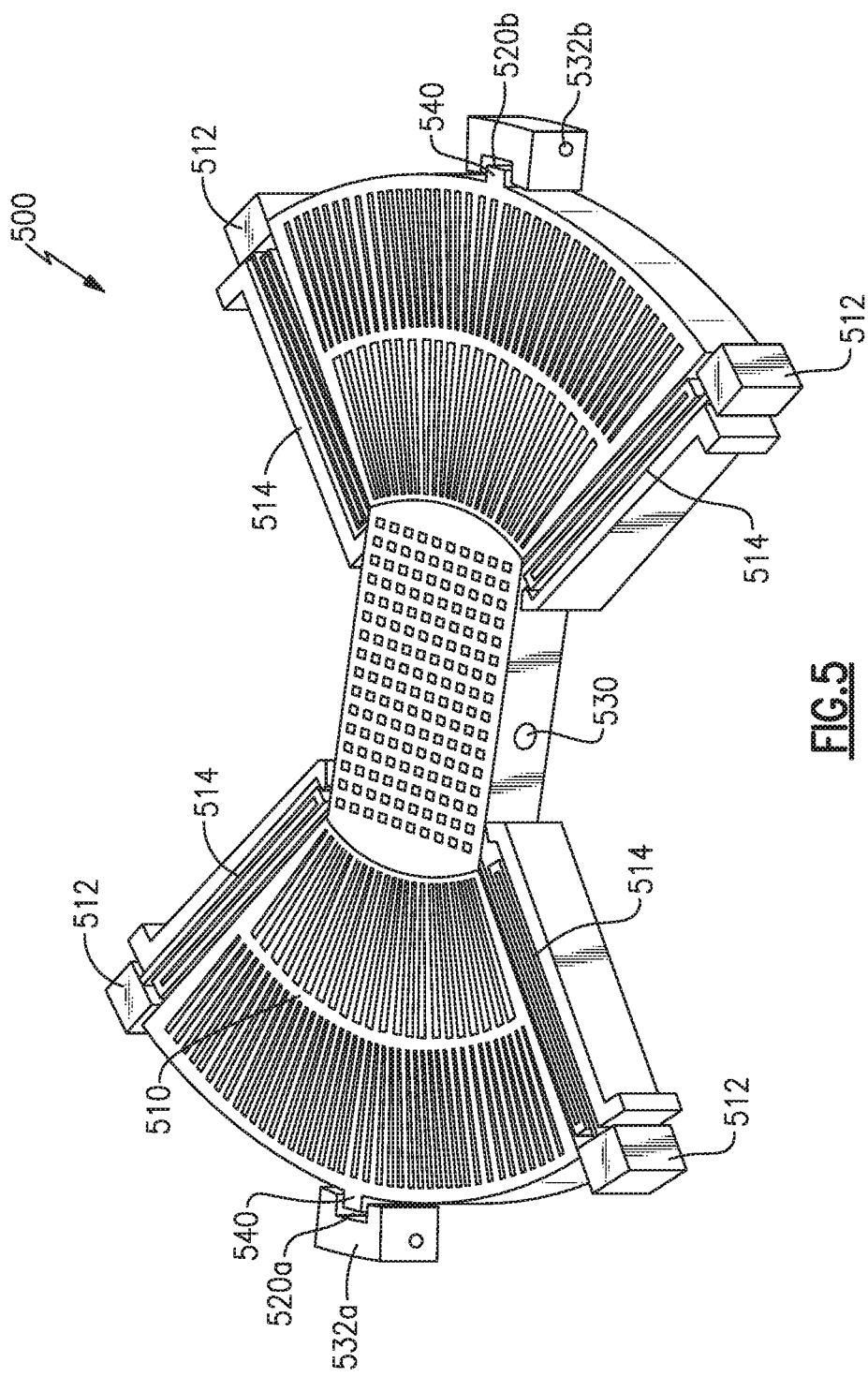
FIG. 5 is a schematic diagram of an example of a magnetic switch.

Another example of a resonant switch 110 includes a magnetic switch responsive to a dynamic magnetic field that may be formed from a magnetometer or a rotational or translational accelerometer provided with a magnetic moment. For example, FIG. 5 shows a magnetic switch 500 that is a rotational accelerometer that may be fabricated as a MEMS device and may be used as the resonant switch 110. The magnetic switch 500 detects magnetic variations at a particular frequency to detect a signature or target signal, e.g., the stimulus 140, generated by an object or event in the environment. The magnetic switch 500 includes a rotor 510 suspended from anchor points 512 by flexible arms 514. The rotor 510 is provided with a magnetic dipole, such as by a magnet incorporated into the rotor 510 or mounted atop the rotor 510, for example, so that a magnetic field influences the rotor 510 to displace in one direction or the other depending upon the magnetic field orientation. Accordingly, a varying magnetic field causes the rotor 510 to vibrate. A set of contacts 520 are positioned so that sufficient motion of the rotor 510 intermittently closes one or more of the contacts 520.

The resonant frequency of the magnetic switch 500 depends upon the stiffness of the flexible arms 514, e.g., a spring constant, and the distribution of mass (moment of inertia) of the rotor 510, among other things. The sensitivity of the magnetic switch 500 depends upon the strength of the magnetic dipole coupled to the rotor 510, among other things. The selectivity of the magnetic switch 500 is influenced by similar factors to that of the vibration switch 200 discussed above.

Still referring to FIG. 5, the magnetic switch 500 also includes terminals 530, 532a, and 532b. The terminal 530 is electrically connected to the anchor points 512 and provides electrical connectivity through the flexible arms 514 and the rotor 510 to one side each of contact 520a and 520b. The other side of contact 520a is electrically connected to the terminal 532a and the other side of contact 520b is electrically connected to the terminal 532b. A varying magnetic environmental stimulus causes the rotor 510 to vibrate. If the environmental stimulus is strong enough and near enough in frequency to the resonant frequency, the rotor 510 vibrates sufficiently to intermittently close one or both of the contacts 520. Closure of either of the contacts 520 causes an electrical connection to exist between the terminal 530 and a respective one of the terminals 532. Accordingly, the terminal 530, the contact 520a, and the terminal 532a form a switch that may form the electrical switch 130 of FIG. 1 Likewise, the terminal 530, the contact 520b, and the terminal 532b form a switch that may form the electrical switch 130 of FIG. 1. In the magnetic switch 500 of FIG. 5, each of two protrusions 540 from the rotor 510 provide one side of each of the contacts 520.

As with the vibration and acoustic switches described above, certain modifications can be made to a magnetic switch, such as the magnetic switch 500. For example, tuning elements, such as capacitive tuning elements or other tuning elements, may be included to provide further tunability of the resonant frequency of the rotor, such as rotor 510. Additionally, material may be added or removed from any of the components of a magnetic switch to permanently alter the resonant frequency or a range of frequencies in which the resonant frequency may be tuned by the tuning elements, e.g., capacitive tuning elements. Additionally, the contact(s) may be formed with a varying gap size and may provide a varying amount of stiffness, or give, to allow some movement upon contact closure, reducing the impact of the contact on the motion of the rotor, such as rotor 510. As discussed above, in certain embodiments a contact gap may be a nominal 5 microns (micrometers, μm) but may be 10 microns or more, or may be sub-micron distances depending upon the frequency and strength of the stimulus 140 to be detected and on the geometry, size, and materials.

Having described various examples of mechanical resonant switches, such as a vibration switch, an acoustic switch, and a magnetic switch, each responsive to an environmental physical stimulus, any such switches may be put to a beneficial application in the sensor 100 of FIG. 1 and variations thereof. For example, a sensor may be desired to detect the presence and operation of a generator. The generator may emit acoustic energy (e.g., sound waves), vibrational energy (e.g., through the ground), and a varying magnetic field (e.g., from a rotating magnet within the generator). One or more frequencies of each of these types of emitted energies may be present, and a particular generator of interest may have a known signature, or target signal, of particular sets of frequencies of particular emission types: acoustic, vibrational, and magnetic. Similarly, a particular type of vehicle of interest may have a known (or determinable) signature, or target signal, of particular sets of frequencies of particular emission types: acoustic, vibrational, and magnetic. Likewise, an event such as a particular type of explosion, a vehicle crash, or lightning, for example, may be characterized by a particular set of frequencies of particular emission types.

It may be desirable to detect a particular event or object by sensing one or more emissions, at particular frequencies, created by the event or object, to generate a detection signal, e.g., an integrated output signal at the sensor output terminal 180. It may also be desirable to detect any one of a set of events or objects by the same sensor. It may also be desirable not to generate a detection signal if a particular stimulus is present. Accordingly, certain embodiments include various logical arrangements of resonant switches to generate a detection signal, responsive to stimuli, that require multiple stimuli (a logical AND function) to be present, alternative stimuli (a logical OR function) to be present, or one or more stimuli to not be present (a logical NOT function) when one or more others are present. Examples of various logical arrangements are shown in FIGS. 6A-6C.

Figure 6A:
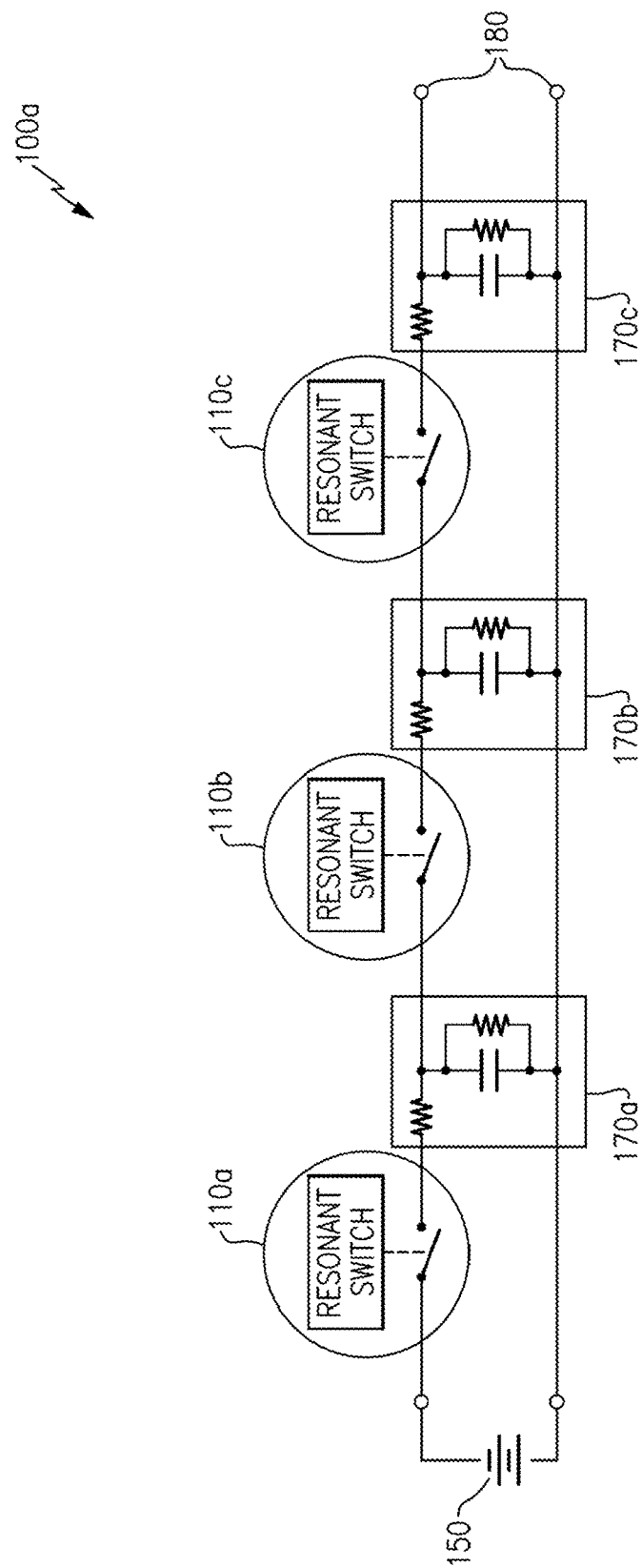
FIGS. 6A-6C are schematic diagrams of various examples of physical sensors incorporating various logic arrangements of resonant switches.

FIG. 6A shows a sensor 100a that includes three resonant switches 110a, 110b, and 110c arranged in an AND logic configuration. Each of the three resonant switches 110 responds to a different frequency of physical stimulus, whether acoustic, vibration, or magnetic, and the three resonant switches 110 are coupled together in series. In the embodiment of FIG. 6A, an integrator circuit 170 is associated with each of the resonant switches 110, but in other embodiments there may be fewer or no integrators. In a certain embodiment, the resonant switch 110a nearest a battery terminal, e.g., where the battery 150 may be connected, is the resonant switch designed for the highest frequency expected. The benefit of placing the highest frequency "first" in the series is that the electrical connection provided by the first resonant switch 110a to the first integrator circuit 170a will have the highest rate of intermittent connection and therefore will provide energy to the integrator circuit 170a rapidly. As a result, the first integrator circuit 170a is quickly ready to provide electrical energy down the line, i.e., to the second resonant switch 110b, and so on. If an event occurs or an object is present that provides the set of stimuli to which the resonant switches 110 are responsive, electrical energy will be transferred, in intermittent packets of energy, from the battery 150 through the first resonant switch 110a to the first integrator circuit 170a, through the second resonant switch 110b to the second integrator circuit 170b, and through the third resonant switch 110c to the third integrator circuit 170c, to provide an integrated output signal at the sensor output terminal 180 that indicates the event or object has been detected. The integrated output signal will only indicate that the event or object is detected when the proper stimulus is received to activate all of the resonant switches 110. Accordingly, the arrangement shown in FIG. 6A provides a logical AND functionality, requiring a first, second, AND third stimulus all be present to which each of the first, second, and third resonant switches are respectively responsive.

Figure 6C:
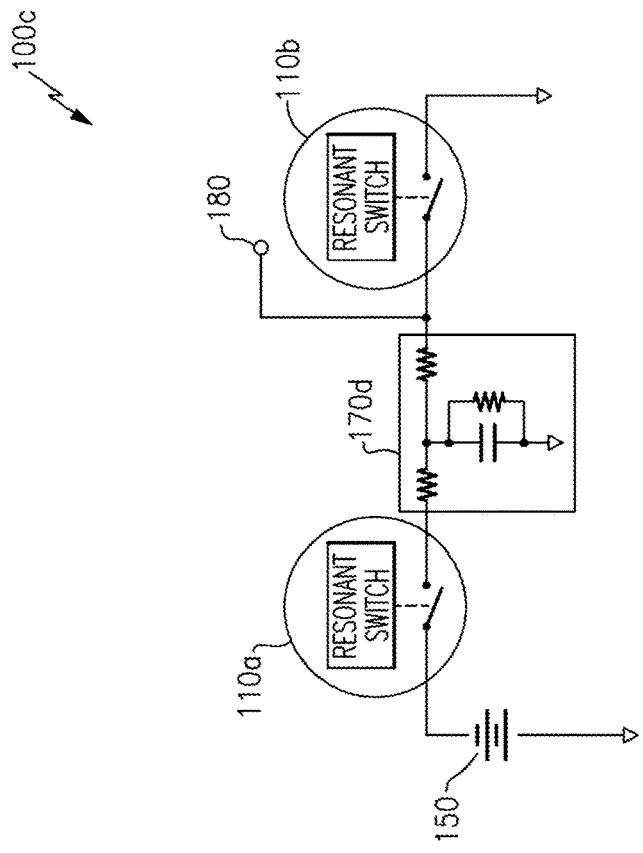
Figure 6B:
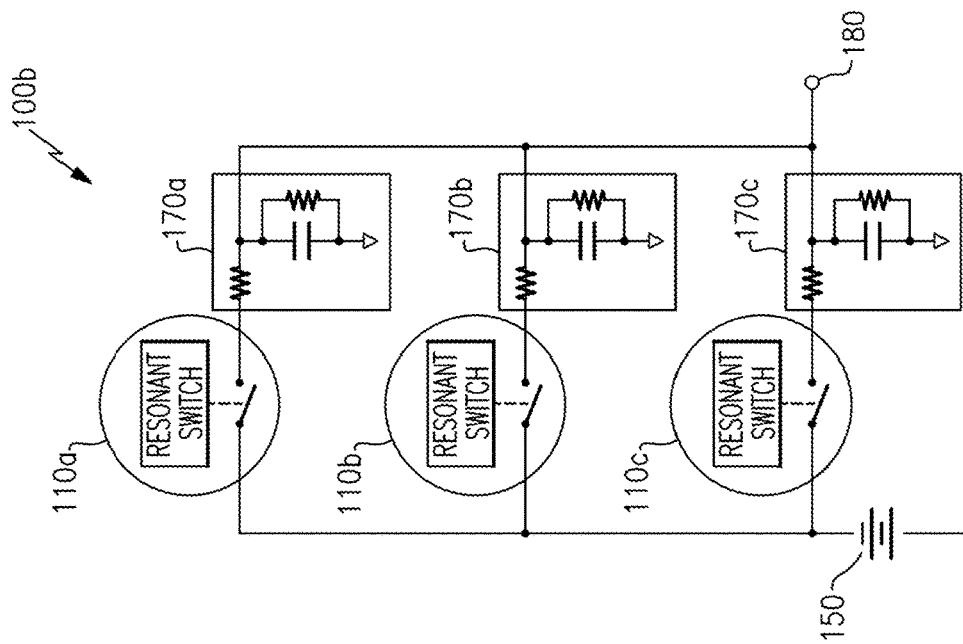

FIG. 6B shows a sensor 100b that includes three resonant switches 110a, 110b, and 110c arranged in an OR logic configuration. Each of the three resonant switches 110 responds to a different frequency of physical stimulus, whether acoustic, vibration, or magnetic, and the three resonant switches 110 are coupled together in parallel. In the embodiment of FIG. 6B, an integrator circuit 170 is associated with each of the resonant switches 110, but in other embodiments there may be fewer or no integrators. If an event occurs or an object is present that provides the stimulus to which any of the resonant switches 110 is responsive, electrical energy will be transferred, in intermittent packets of energy, from the battery 150 through the responsive resonant switch 110 to an associated integrator circuit 170 to provide an integrated output signal at the sensor output terminal 180 that indicates the event or object has been detected. Accordingly, the arrangement shown in FIG. 6B provides a logical OR functionality, responsive to any of a first, second, OR third stimulus to which each of the first, second, and third resonant switches are respectively responsive.

FIG. 6C shows a sensor 100c that includes two resonant switches 110a and 110b arranged in a NOT logic configuration. Each of the two resonant switches 110 responds to a different frequency of physical stimulus, whether acoustic, vibration, or magnetic, and the two resonant switches 110 are coupled together such that resonant switch 110b will negate any detection signal generated by resonant switch 110a. In the embodiment of FIG. 6C, an integrator circuit 170d is included between the resonant switches 110, and the integrated output signal is provided at the sensor output terminal 180 of the integrator circuit 170d. Alternate embodiments may have a different or no integrator. If an event occurs or an object is present that provides the stimulus to which the resonant switch 110a is responsive, electrical energy will be transferred, in intermittent packets of energy, from the battery 150 through the resonant switch 110a to the integrator circuit 170d, to provide the integrated output signal to indicate the event or object has been detected, unless there is also a stimulus present to which the resonant switch 110b is responsive, in which case the resonant switch 110b intermittently connects both the integrator circuit 170d and the integrated output terminal 180 to ground, discharging the integrator circuit 170d and effectively negating the detection indication. Accordingly, the arrangement shown in FIG. 6C provides a logical NOT functionality, indicating detection in response to a first stimulus (to which the resonant switch 110a is responsive), only if a second stimulus (to which the resonant switch 110b is responsive) is NOT present.

It will be appreciated by those skilled in the art, with benefit of the disclosure contained herein, that many other logical arrangements of resonant switches may be formed to create a specific sensor that targets one or more events or objects to generate a detection signal. For example, while the logical arrangements of FIGS. 6A-6C each include a particular number and arrangement of resonant switches, embodiments may include more or fewer resonant switches in any combination of AND, OR, and NOT arrangement to accommodate particular operational requirements or changing applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An environmental physical sensor comprising:
a power input terminal;
a sensor output terminal; and
a resonant switch including a mechanical element responsive to an environmental stimulus, and an electrical switch coupled to the mechanical element and operable between an open position and a closed position, the electrical switch configured to electrically connect the power input terminal to the sensor output terminal when in the closed position, and the mechanical element configured to intermittently actuate the electrical switch into the closed position responsive to the environmental stimulus.

2. The sensor of claim 1 further comprising:
an integrator circuit electrically connected between the electrical switch and the sensor output terminal, the integrator circuit configured to receive and integrate energy pulses from the power input terminal to provide a detection signal at the sensor output terminal.

3. The sensor of claim 2 wherein the integrator circuit includes an electrical energy storage element that is one of a capacitor and an inductor.

4. The sensor of claim 1 wherein the environmental stimulus is one of an acoustic signal, a vibration, a varying magnetic field, thermal energy, radiation, and an electric field.

5. The sensor of claim 1 wherein the electrical switch includes a material with a contact adhesion force of up to 100 micro-Newtons.

6. The sensor of claim 1 wherein the electrical switch includes a mechanically flexible mount configured to be flexibly compliant in response to the electrical switch being actuated into a closed position.

7. The sensor of claim 1 wherein the electrical switch includes a contact gap of up to 10 microns.

8. The sensor of claim 1 wherein the mechanical element is configured to vibrate at a resonant frequency in response to the environmental stimulus.

9. The sensor of claim 8 wherein the mechanical element vibrates rotationally.

10. The sensor of claim 9 wherein the mechanical element includes a rotor.

11. The sensor of claim 8 wherein the mechanical element includes at least one electrostatic tuning element configured to apply an electrostatic force that alters the resonant frequency of the mechanical element.

12. The sensor of claim 1 wherein the mechanical element includes a paddle mounted to pivot, about a pivot axis, to actuate the electrical switch into the closed position.

13. The sensor of claim 12 wherein the paddle includes a solid portion on a first side of the pivot axis and a perforated portion on a second, opposing side of the pivot axis.

14. The sensor of claim 12 further comprising an acoustic cavity coupled to the paddle.

15. The sensor of claim 12 wherein a pendulosity of the paddle on a first side of the pivot axis is substantially equal and opposite to a pendulosity of the paddle on a second, opposing side of the pivot axis, resulting in substantially zero pendulosity of the paddle.

16. The sensor of claim 1 wherein the mechanical element is imbalanced, having a non-zero pendulosity, the pendulosity configured to influence responsiveness of the mechanical element to the environmental stimulus.

17. The sensor of claim 1 wherein the electrical switch is configured to have a substantially zero current leakage when in the open position.

18. An environmental physical sensor comprising:
a power input terminal;
a sensor output terminal;
a first resonant switch including a first mechanical element responsive to a first component of an environmental stimulus, and a first electrical switch coupled to the power input terminal and coupled to the first mechanical element and operable between an open position and a closed position, the first mechanical element configured to intermittently actuate the first electrical switch into the closed position responsive to the first component; and
a second resonant switch including a second mechanical element responsive to a second component of the environmental stimulus, and a second electrical switch coupled to the first electrical switch and coupled to the sensor output terminal and coupled to the second mechanical element and operable between an open position and a closed position, the second mechanical element configured to intermittently actuate the second electrical switch into the closed position responsive to the second component.

19. The sensor of claim 18 wherein the first electrical switch and the second electrical switch are configured to electrically connect the power input terminal to the sensor output terminal in response to a particular logical combination of presence or absence of the first component and presence or absence of the second component.

20. The sensor of claim 18 wherein the first component and the second component are each one of an acoustic signal, a vibration, a varying magnetic field, thermal energy, radiation, and an electric field.

21. The sensor of claim 18 wherein the first component has a first frequency and the second component has a second frequency different from the first frequency.

* * * * *